J. HEBERLING & G. O. VAN HOESEN.
COMPUTING INSTRUMENT.
APPLICATION FILED JAN. 5, 1915.

1,202,728.

Patented Oct. 24, 1916.
4 SHEETS—SHEET 1.

WITNESSES:

INVENTORS
John Heberling
George O. Van Hoesen
BY
Their ATTORNEY

J. HEBERLING & G. O. VAN HOESEN.
COMPUTING INSTRUMENT.
APPLICATION FILED JAN. 5, 1915.

1,202,728.

Patented Oct. 24, 1916.
4 SHEETS—SHEET 3.

WITNESSES:
Frances Jacubowitz
Ada M. Whitmore

INVENTORS
John Heberling
George O. Van Hoesen
BY
H. H. Simms
Their ATTORNEY

J. HEBERLING & G. O. VAN HOESEN.
COMPUTING INSTRUMENT.
APPLICATION FILED JAN. 5, 1915.

1,202,728.

Patented Oct. 24, 1916.
4 SHEETS—SHEET 4.

WITNESSES:

INVENTORS
John Heberling
George O. Van Hoesen
BY
ATTORNEY

UNITED STATES PATENT OFFICE.

JOHN HEBERLING AND GEORGE O. VAN HOESEN, OF ROCHESTER, NEW YORK.

COMPUTING INSTRUMENT.

1,202,728.        Specification of Letters Patent.       Patented Oct. 24, 1916.

Application filed January 5, 1915. Serial No. 580.

*To all whom it may concern:*

Be it known that we, JOHN HEBERLING and GEORGE O. VAN HOESEN, both of Rochester, in the county of Monroe and State of New York, have invented a new and useful Improvement in Computing Instruments, which improvement is fully set forth in the following specification and shown in the accompanying drawings.

The present invention relates to instruments for computing square measurements of lumber or other material and an object thereof is to provide a machine which is adjustable to correspond with one dimension of the lumber such, for instance, as the width, without affecting the movement of the counting mechanism, and is then adjustable to correspond with another dimension of the material to move the counting mechanism proportionate to both adjustments so that the counter registers the square measurement of the two dimensions.

Figure 1:
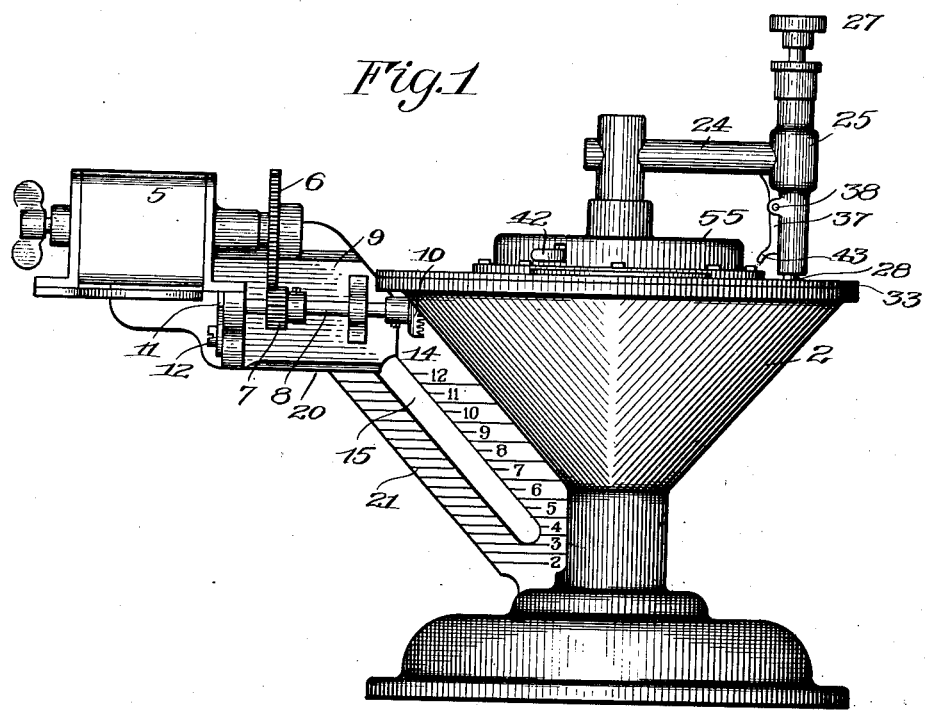
Figure 2:
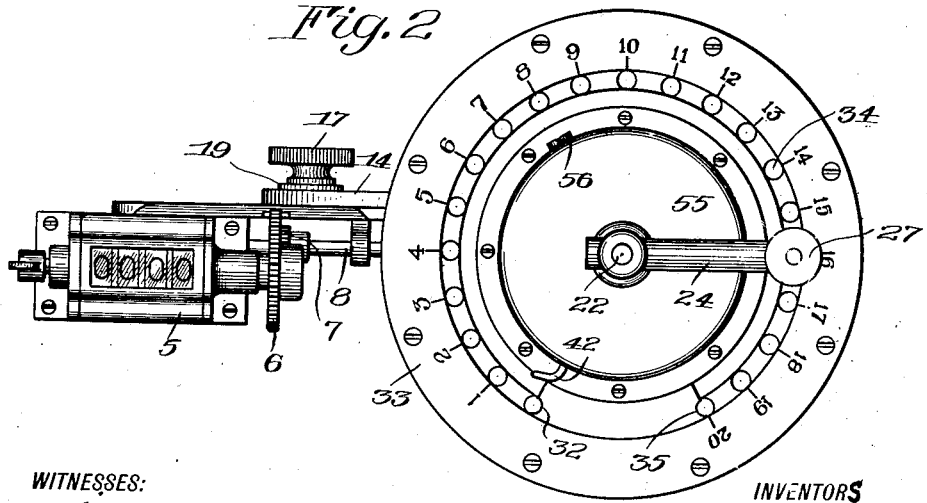
Figure 3:
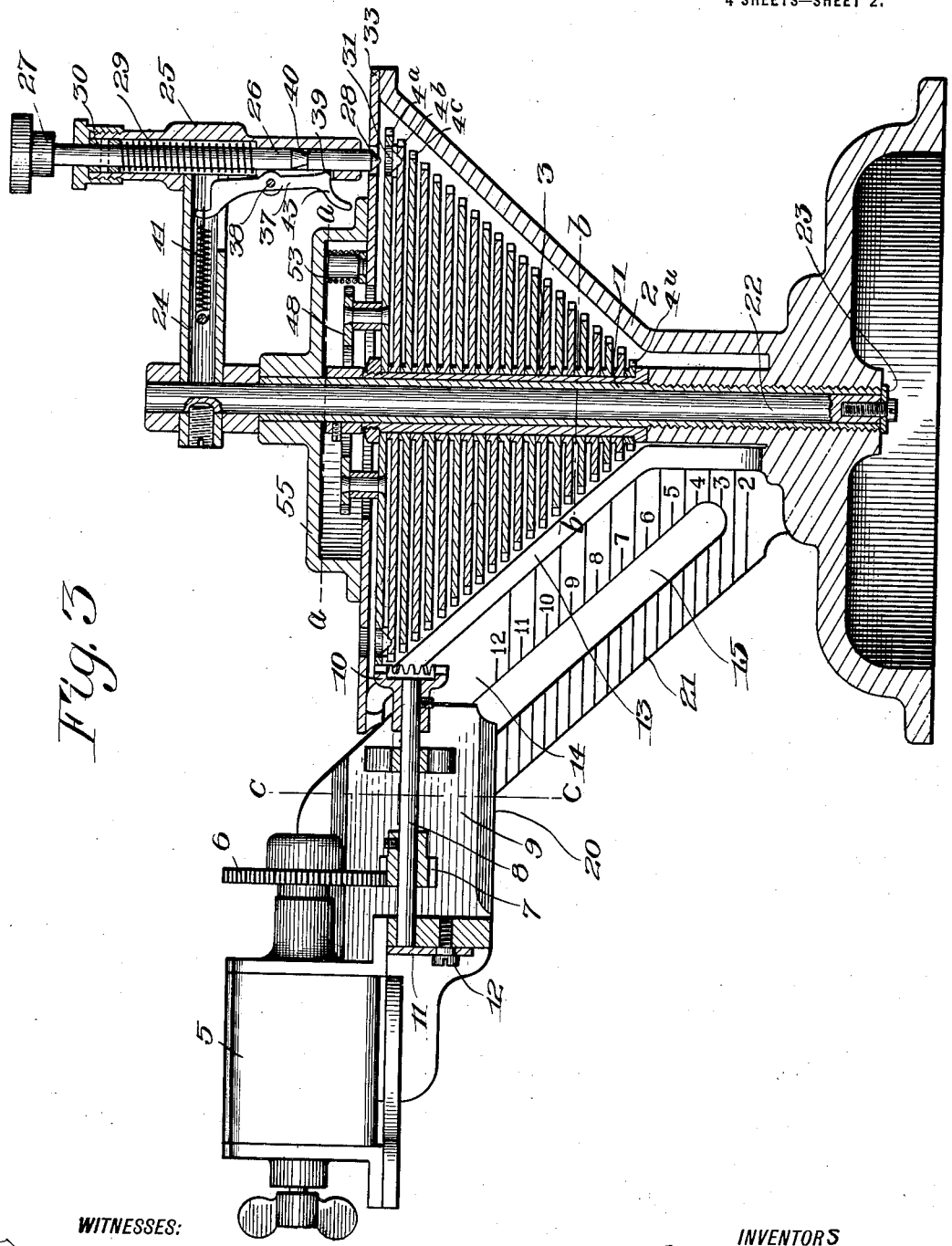
Figure 4:
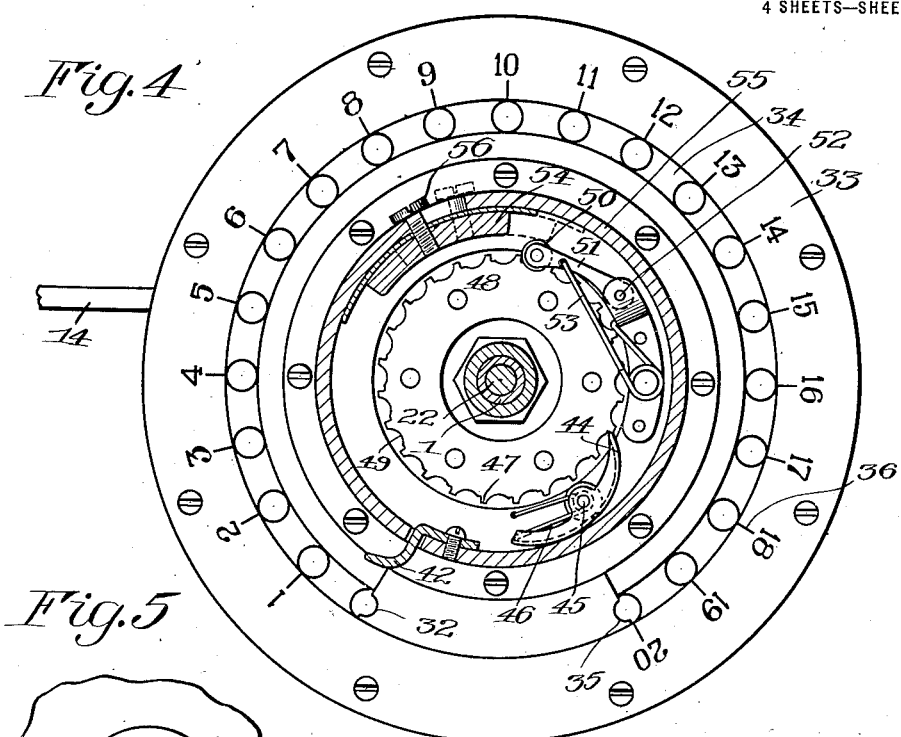
Figure 5:
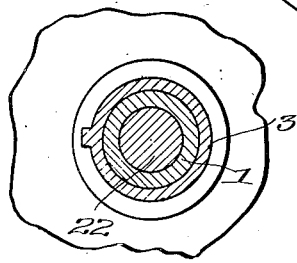
Figure 6:
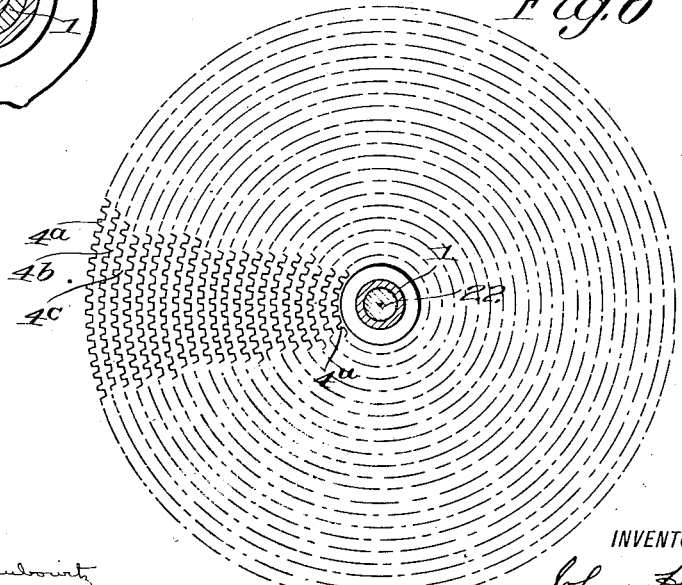
Figure 7:
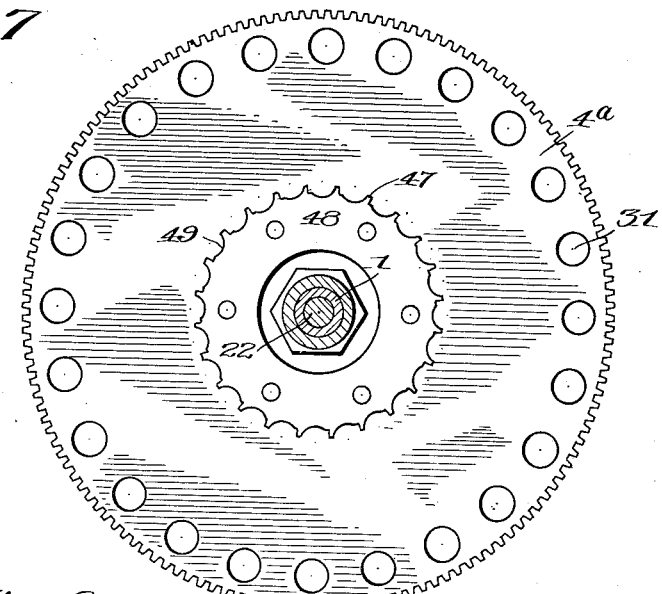
Figure 8:
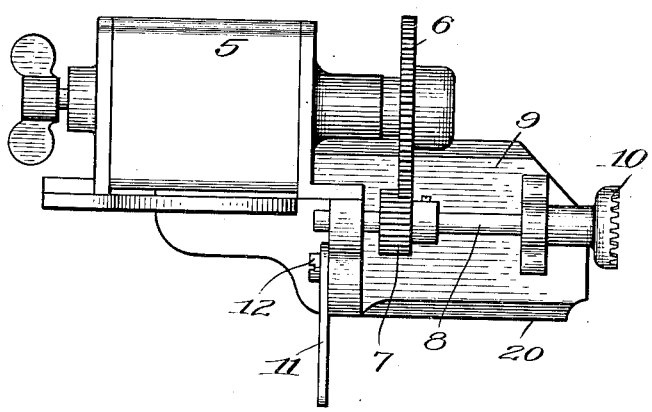
Figure 9:
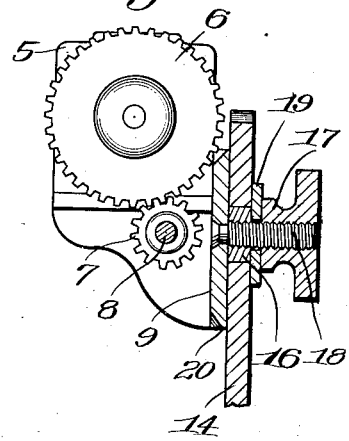
Figure 10:
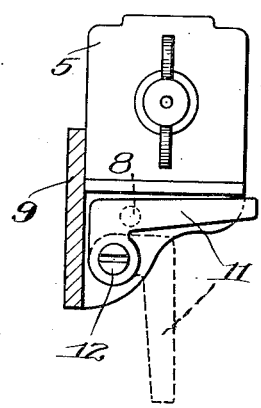

In the drawings, Figure 1 is a side view of a machine embodying the present invention; Fig. 2 is a plan view of the same machine; Fig. 3 is a vertical section through the machine; Fig. 4 is a horizontal section on the line $a$—$a$, Fig. 3; Fig. 5 is a horizontal section on the line $b$—$b$, Fig. 3; Fig. 6 is a view of the rotary member from the bottom side thereof showing the different gears; Fig. 7 is a top view of the rotary member; Fig. 8 shows the counting mechanism and its supporting frame in side elevation; Fig. 9 is a section on the line $c$—$c$, Fig. 3; and Fig. 10 is an end view of the counting mechanism and its supporting frame.

In the illustrated embodiment of the invention, there is provided a movable member which preferably is mounted to rotate on a tubular standard 1 arranged within a casing 2 which may inclose the rotary member. In this instance, this rotary member is in the form of a sleeve 3 turning on the tubular shaft 1 and having thereon a number of devices such, for instance, as gears $4^a$, $4^b$, $4^c$, etc., to $4^u$, any one of which is adapted for connection with the counting mechanism. These gears are of different diameters, and preferably gradually decrease in diameter from the gear $4^a$ to the gear $4^u$, each successive gear having six fewer teeth than the one next above it. In this way, the counting mechanism may be connected to the rotary member at different distances from the axis of rotation of said rotary member to correspond with one dimension, the width, in this instance, of the material to be computed. In order that this connection may be made, the counting mechanism 5, which may be of any suitable construction, the one shown being an adder of known commercial form, is provided with a gear wheel 6 which meshes with a pinion 7 rigidly secured to a sliding shaft 8 that is mounted on a frame 9, the frame also serving to support the casing of the counting mechanism 5. This shaft 8 also carries a crown gear 10 at one end for meshing with any one of the gears $4^a$ to $4^u$, and the shaft 8 may be held against axial movement by a latch 11 which is pivoted to the frame 9 to engage with the end of the shaft opposite that which carries the crown gear 10. When the shaft 8 is in one position, the crown gear meshes with one of the gears $4^a$ to $4^u$ and when in the other position, the crown gear can be moved out of engagement with such gears to permit the movement of the frame 8 so that the crown gear 10 may be positioned to engage with any other one of the gears $4^a$ to $4^u$. For this latter purpose, the casing 2 is provided with a slot 13 and with a guide flange 14 projecting therefrom at one side of the slot, the guide flanges in turn being provided with an inclined slot 15 in which an inclined lug 16 on the rear face of the frame 9 operates. The frame 9 is held in different positions on the flange 14 by means of a clamping nut 17 which turns on a screw 18 projecting from the inclined lug 16, the nut forcing a washer 19 against the rear face of the flange 14 to draw the rear face of the frame 9 against the front face of the flange 14. The lower edge of the frame 9 may be in the form of a straight edge 20 to register with any one of the scores or lines 21 formed on the flange 14, each of said lines determining the position of the frame 9 to engage with one of the gears $4^a$ to $4^u$, the gears, in this instance, each representing a half of one inch difference with respect to its proximate gear.

It is apparent from the foregoing that it is possible to vary the connection between the rotary member and the counting mechanism to correspond with the one dimension of the material to be computed. This adjustment may be maintained so that if a number of articles having one uniform dimension are to be computed, it is merely necessary to adjust the machine once for this common dimension.

It is preferred to employ a single operating member for the rotary gear carrying member, this operating member being adapted to effect the movement of the rotary member a distance proportional to the other dimension of the material to be computed. In this instance, this operating member is in the form of a shaft 22 extending through the tubular shaft 1 and having a collar 23 at its lower end to prevent the withdrawal of the shaft 22 from the hollow shaft 1. The upper end of the shaft 22 carries a tubular arm 24 which abuts the upper end of the hollow shaft 1 and extends laterally, its outer end having a vertically-arranged guide sleeve 25. In this guide sleeve, a plunger 26 is arranged, the upper end of the plunger having a finger piece 27 above the sleeve 25 and the lower end of the plunger projecting below the sleeve at 28. Normally, the plunger is held in an elevated position by a coil spring 29 surrounding said plunger within the sleeve 25 and engaging a collar 30 on said plunger. When the plunger 26 is depressed, its lower end moves into a notch or pocket 31, of which there is an annular series formed in the upper gear 4$^a$, so as to establish driving or interlocking connection between the operating member and the rotary gear carrying member. Normally the operating member lies with the projecting end of the plunger 28 against a shoulder 32 on a plate 33 which forms the top of the casing 1, said plate having a segmental slot 34 therein extending from the shoulder 32 to another shoulder 35 which forms the limit of adjustment of the operating member. About this curved or segmental slot 34, the top plate 33 is provided with a number of divisions 36, with suitable indicating matter, spaced apart a distance equal to the distance between the centers of the pockets or openings 31.

To shift the rotary member with the gears, the oscillatory operating member is turned until the plunger 26 lies over a pocket 31 adjacent to a division 36 corresponding to the dimension of the article to be computed. The plunger is then depressed to engage with a pocket 31 and the operating member is returned to its normal position against the stop 32, carrying the rotary member therewith and transmitting motion through one of the gears 4$^a$ to 4$^u$ to the counting mechanism.

With the end in view of compelling the user of the machine to return the operating member to the stop 32 on every operation, there is provided a locking device preferably in the form of a latch 37 pivoted at 38 to the guide arm 25 and having an end 39 adapted for engagement with a shoulder 40 on the plunger 26 when the latter is depressed, thus holding the plunger against return movement, this latch entering the notch 40 automatically under the action of the spring 41. When the operating member reaches the stop 32, the plunger 26 is released by means of a shoulder 42 arranged on the top plate 33 in a position to engage the hooked end 43 on the latch 37. The movement of the rotary member in a direction opposite to that in which it is moved by the operating member, is prevented by a pawl 44 pivoted at 45 to the top plate 33 and moved by a spring 46 to engage teeth 47 on a ratchet wheel 48 which is rigidly secured to the uppermost gear 4$^a$. This ratchet wheel has curved recesses 49 between its teeth 47 for the reception of a roller 50 mounted on an arm 51 pivoted at 52 to the top plate and pressed by a spring 53 so that the roller is held toward the wheel 48. The roller does not, under ordinary conditions, prevent the rotation of the rotary member but is provided to retard the movement of such member so as to prevent the momentum thereof carrying it beyond the desired adjustment. The roller may also be utilized for locking the rotary member against rotation and, to this end, a slide 54 is arranged on the cap 55 which is mounted on the plate 33 about the pawl 44, ratchet wheel 48 and dog 51, said slide having an operating portion 56 extending to the exterior of the cap so that the slide may be made to engage or disengage with the roller 50.

The operation of the invention will be understood from the foregoing but it may be summarized as follows: Assume that it is desired to measure the square feet of lumber which is two inches in width, the frame 9 is adjusted on the frame 14 until the edge 20 coincides with the line "2." Before this adjustment can be effected, the latch 11 is moved to permit the shaft 8 to be moved axially to withdraw the crown gear 10 from engagement with the gear wheel 4$^a$, and, after the movement of the frame 9 is effected, the shaft 8 is again moved axially to bring the gear 10 in engagement with the gear 4$^u$. A piece of lumber with a given length in feet is then computed by shifting the operating member until the plunger 26 is opposite the division corresponding to such length in feet, after which the plunger is depressed so that its lower end engages in the adjacent pockets 31. The operating member is then returned to the stop 32, being held against rising by the latch 37 until the stop is reached, and carrying the rotary member with such operating member, thereby transmitting motion to the counting mechanism proportional to the product of the width of the material multiplied by the length. While one adjustment is effected to correspond with one dimension in inches and the other adjustment is effected to correspond with the other dimension in feet, the gears are so proportioned that the product is in square feet. If material of another width is to be measured, the counting mechanism is connected to the gear wheel corresponding to the width of the material.

From the foregoing, it will be seen that there has been provided a mechanism which employs a member to which movements are given corresponding to one dimension of material to be computed and means is provided by which the counting mechanism may be adjustably connected to this member to correspond with another dimension to be computed. Furthermore, there has been provided a plurality of devices each representing different widths of material to be computed with means for effecting connection between any one of said devices and a counting mechanism and means by which said devices are operated distances to correspond to one dimension of the material to be measured. The gear wheels provide means by which the counting mechanism may be connected to the rotary member at different distances from the center of such member. All of these features, together with the other features herein described, enable me to secure a computing mechanism which is of simple construction and not liable to get out of order. These arrangements also make it impossible for the machine to render inaccurate results.

The machine has been designed especially for computing the square feet of lumber as the workmen handling lumber are usually without education sufficient to compute the square measurement. By this invention, the user merely is required to adjust the machine for the width in inches and then adjust it for length in feet, thereby adding the product in square feet to the sum already registered in the counter.

What I claim as my invention and desire to secure by Letters Patent is:

1. An instrument for computing square measurement comprising a member, means for preventing the movement of said member in one direction and permitting it to move in the opposite direction, a stationary indicator, movable means for coöperating with the stationary indicator and adapted to connect and disconnect with said member for moving the latter a distance to correspond with one dimension of the material to be computed, counting mechanism for determining the movement of said member, and means for varying the connection between said member and the counting mechanism to correspond with another dimension of the material to be computed.

2. An instrument for computing square measurement comprising a counting mechanism, a plurality of devices each representing different widths of material to be computed, means for effecting connection between said counting mechanism and any one of said devices, means for preventing the movement of said devices in one direction and permitting them to move in the other direction, a stationary indicator, and movable means coöperating with said stationary indicator and adapted to connect and disconnect with said devices for operating the latter distances corresponding with the lengths of the materials to be computed.

3. An instrument for computing square measurement comprising a counting mechanism having a gear connected thereto, a plurality of gears of different diameters mounted to turn together about a common axis, means for effecting connection between any one of said gears and the gear connected to the counting mechanism, means for preventing the rotation of said gears in one direction while permitting them to rotate in the other direction, a stationary indicator, a movable member adapted to connect and disconnect with the gears for rotating said gears distances to correspond with the lengths of the materials to be computed.

4. An instrument for computing square measurement comprising a rotary member, a counting mechanism, means for connecting said counting mechanism to the rotary member at any one of a number of distances from the axis of rotation of said rotary member to correspond with a dimension of a material to be computed, means for preventing the movement of the rotary member in one direction while permitting its rotation in the other direction, a stationary indicator, and an oscillatory member mounted to turn about the axis of rotation of the rotary member and carrying a device adapted to interlock with said rotary member to move the latter a distance to correspond to another dimension of a material to be computed.

5. A computing instrument comprising a rotary member, a counting mechanism, means for connecting said counting mechanism to the rotary member at different distances from the axis of rotation of the rotary member to correspond with one dimension of the object to be measured, means for preventing the movement of the rotary member in one direction while permitting its movement in the other direction, a stationary indicator, an oscillatory member for coöperation with said indicator having a normal position to which it is returned after each operation, a device carried by the oscillatory member to interlock with the rotary member while the oscillatory member is away from normal position to cause the latter to turn with the oscillatory member, a locking device for holding said interlocking device in interlocking position, and means for operating said locking device to release the interlocking device when the operating member reaches normal position.

6. An instrument for computing square measurement comprising a rotary member, a counting mechanism, means for connecting said counting mechanism to the rotary member at different distances from the axis of rotation of said rotary member to correspond with a dimension of a material to be computed, an oscillatory member mounted to turn about the axis of rotation of the rotary member, a spring-pressed plunger mounted on said oscillatory member and movable to interlock with the rotary member, a spring-pressed latch movable automatically to lock the plunger against movement when the latter is interlocked with the rotary member, and a device arranged to operate the latch to release the plunger when the operating member is moved to normal position.

7. An instrument for computing square measurement comprising a rotary member provided with an annular series of pockets concentric with the axis of rotation of said member, a counting mechanism, means for connecting said counting mechanism to the rotary member at different distances from the axis of rotation of said rotary member to correspond with one dimension of the material to be computed, a casing inclosing said rotary member and formed with a segmental slot exposing some of the pockets in the rotary member, one end of the slot serving as a stop, an indicator to one side of the slot, an operating member mounted to turn about the axis of rotation of the rotary member on the exterior of the casing and to coöperate with the indicator, and a device carried by the operating member and movable through the slot to interlock with any one of the exposed pockets in the rotary member, and means for preventing the rotation of the rotary member in one direction while permitting its rotation in the other direction.

8. An instrument for computing square measurement comprising a rotary member having a plurality of gears thereon progressively decreasing in diameter from one end of the member to the other, a counting mechanism, a gear connected with the counting mechanism and adapted for connection with any one of the gears on the rotary member to correspond with one dimension of the material to be computed, means for preventing the rotation of the rotary member in one direction while permitting it to rotate in the other direction, a stationary indicator, and oscillatory means coöperating with the indicator for moving the rotary member a distance to correspond to another dimension of a material to be computed.

9. An instrument for computing square measurement comprising a rotary member having a plurality of gears thereon progressively decreasing in diameter from one end of the member to the other, a casing inclosing said gears and provided with a slot, a frame adjustable on the casing, a counting mechanism arranged on said frame on the exterior of the casing, a gear wheel arranged on the frame and connected to the counting mechanism, said gear wheel being adapted to coöperate with any one of the gears on the rotary member, and means for moving the rotary member a distance to correspond with one dimension of a material to be computed.

10. An instrument for computing square measurement comprising a rotary member having a plurality of gears thereon progressively decreasing in diameter from one end of the member to the other, a casing inclosing said gears, a frame adjustable on the casing, an axially movable shaft arranged on the frame, a counting mechanism connected with the axially movable shaft, a gear wheel on the axially movable shaft adapted to connect with any one of the gears on the rotary member, and means for rotating the rotary member a distance to correspond with one dimension of the material to be computed.

11. A computing instrument comprising a rotary member, means for preventing the movement of said member in one direction while permitting such movement in the other direction, a stationary indicator, movable means adapted to connect with the rotary member at any point along the scale so that the connected point may be moved to the starting point on the scale, means for locking said movable means in connection with the rotary member so that the latter is caused to travel with the rotary member, means for automatically releasing said locking means when the rotary member reaches a certain point on the scale, a counting mechanism for determining the movement of the rotary member, and means for varying the connection between the counting mechanism and the rotary member.

JOHN HEBERLING.
GEORGE O. VAN HOESEN.

Witnesses:
CHARLES RUMPF,
H. H. SIMMS.